United States Patent [19] [11] 4,317,788
Imada et al. [45] Mar. 2, 1982

[54] METHOD FOR MODIFYING SURFACE PROPERTIES OF A SHAPED ARTICLE OF AN ACRYLIC RESIN

[75] Inventors: Kiyoshi Imada, Omiya; Susumu Ueno, Ibaraki; Yasuhide Nishina, Ibaraki; Hirokazu Nomura, Ibaraki, all of Japan

[73] Assignee: Shin-Etsu Chemical Co. Ltd., Japan

[21] Appl. No.: 230,542

[22] Filed: Feb. 2, 1981

Related U.S. Application Data

[63] Continuation-in-part of Ser. No. 158,255, Jun. 10, 1980, abandoned.

[30] Foreign Application Priority Data

Jun. 18, 1979 [JP] Japan .................................. 54-76444

[51] Int. Cl.³ ............................................. B29C 25/00
[52] U.S. Cl. ........................................ 264/22; 264/83; 264/85; 264/232; 264/233; 264/340; 204/165
[58] Field of Search ..................... 264/83, 22, 85, 232, 264/233, 340; 204/165

[56] References Cited

U.S. PATENT DOCUMENTS

| | | | |
|---|---|---|---|
| 3,846,521 | 11/1974 | Osterholtz | 264/22 |
| 3,888,753 | 6/1975 | Kiikka et al. | 204/165 |
| 3,992,495 | 11/1976 | Sano et al. | 204/165 |
| 4,046,843 | 9/1977 | Sano et al. | 264/22 |
| 4,107,049 | 8/1978 | Sano et al. | 264/22 |
| 4,147,745 | 4/1979 | Sano et al. | 264/22 |

Primary Examiner—James H. Derrington
Attorney, Agent, or Firm—Toren, McGeady & Stanger

[57] ABSTRACT

A novel method is proposed for improving the surface properties or, in particular, for increasing the affinity to water of and for reducing accumulation of static electricity on the surface of a shaped article made of an acrylic resin. The inventive method comprises first exposing the surface of the shaped article to low temperature plasma of a gas having no polymerizability in plasma and then bringing the plasma-treated surface into contact with an aqueous solution containing a surface active agent. The effect of the inventive method is so strong and durable that the treated surface remains antistatic even 6 months after the treatment.

4 Claims, No Drawings

METHOD FOR MODIFYING SURFACE PROPERTIES OF A SHAPED ARTICLE OF AN ACRYLIC RESIN

This is a continuation-in-part of U.S. application Ser. No. 158,255 filed June 10, 1980 now abandoned.

BACKGROUND OF THE INVENTION

The present invention relates to a method for modifying surface properties of shaped articles of an arcylic resin or, more particularly, to a method for reducing electrostatic charge on the surface of the shaped article and to enhance affinity to water of the surface of the shaped article of an acrylic resin by utilizing low temperature plasma.

As is well known, acrylic resins belong to one of the important classes of thermoplastic synthetic resins owing to their high anti-weathering resistance and high transparency and they are used widely for shaping various articles such as windshields of vehicles, dormer windows and skylights, lenses for taillights of automobiles, coverings for television screen, coverings for machines and instruments, sunglasses and the like.

Despite the excellent properties described above, shaped articles made of an acrylic resin have a defective point which limits the usefulness of the resin to a large extent. That is, the surface of an acrylic resin shaped article has poor affinity to water and becomes readily charged with static electricity which attracts dusts to be deposited thereon to a loss of the surface beautifulness. In addition, the surface is rather susceptible to scratches so that the transparency of the shaped article is rapidly lost after a relatively short period of use.

Of course, the problem of accumulation of electrostatic charge on the surface of a shaped article is not limited to the acrylic resins but also most of plastic materials suffer from this problem. Therefore, various attempts have been made to solve this problem. For example, the most conventional method is to coat the surface of the shaped article with an anti-static agent or to incorporate an anti-static agent into the resin composition before fabricating it into shaped articles.

These methods are, however, far from satisfactory. The former method of coating with an anti-static agent is defective in the poor durability of the anti-static effect in addition to the disadvantages of stickiness of the surface and blocking or sticking together of the shaped articles kept in contact with each other although the method is effective when an instant anti-static effect is desired.

The latter method of incorporating an anti-static agent into the resin composition is not so effective in increasing the affinity of the surface to water, although the surface resistivity can be decreased to some extent, so that the method is not always practical with its relatively low anti-static effect notwithstanding the durability of the effect. When the amount of incorporation of the anti-static agent is increased with an object to enhance the anti-static effect on the surface of the article, several drawbacks are unavoidable in the sticky touch of the surface, blooming or bleeding of the added anti-static agent and blocking of the articles kept in contact with each other along with decreased workability of the resin composition in molding as well as coloring of the surface, increased susceptibility to stain and decreased heat resistance.

Moreover, incorporation of an anti-static agent is basically to be avoided since even a small amount of an anti-static agent may greatly reduce the transparency of the acrylic resin shaped articles because the compatibility or affinity of an anti-static agent with the acrylic resin can never be perfect decreasing the beautifulness of the article to a great extent.

Recently, there has been proposed a method of a principle quite different from the use of an anti-static agent, in which the surface of a shaped article of an acrylic resin is exposed to low temperature plasma of a gas under a low pressure so that the affinity of the surface to water is improved and the accumulation of electrostatic charge on the surface can be reduced to some extent. The effectiveness of this method is, however, not always satisfactory.

SUMMARY OF THE INVENTION

Thus, it is an object of the present invention to provide a novel and improved method for reducing the electrostatic charge on the surface of a shaped article of an acrylic resin which is so effective and durable that the above described shortcomings in the prior art methods can be overcome by a very simple means.

The method of the present invention, established as a result of the extensive investigations undertaken by the inventors for improving the surface properties of a shaped article made of an acrylic resin, comprises:

(a) subjecting the surface of the shaped article containing no anti-static agent or surface active agent to exposure to low temperature plasma of a gas having no polymerizability in the plasma condition and (b) bringing the plasma-treated surface of the shaped article into contact with an aqueous liquid inert to the acrylic resin, preferably, containing a surface active agent.

Despite the simplicity of method, in which the liquid inert to the acrylic resin can be mere water, the effectiveness of the inventive method is so remarkable and durable that the surface of the shaped article subjected to the treatment in accordance with the invention remains anti-static even after 6 months.

Moreover, the shaped article treated according to the inventive method retains satisfactorily high transparency and beautifulness of the appearance as well as mechanical strengths as in the untreated articles.

DETAILED DESCRIPTION OF THE PREFERRED EMBODIMENTS

Recently, there has been disclosed a method in which a membrane of a water-insoluble polymeric resin, e.g. polyvinyl chloride, polymethyl methacrylate and the like, containing a large amount of a surface active agent or a water-soluble polymer is treated with low temperature plasma followed by leaching of the surface active agent or the water-soluble polymer with water out of the membrane to give a porous, semipermeable membrane useful for separation of substances (see U.S. Pat. No. 4,046,843). Such a porous membrane is, however, far from the object of the present invention since the beautiful transparency as well as the mechanical strengths of the acrylic resin shaped article are completely destroyed or changed. Accordingly, it is essential in the present invention that the shaped article of the acrylic resin contains no surface active agent which can be an anti-static agent when incorporated into the shaped article in order that the shaped article has a highest transparency inherent to an acrylic resin.

What is meant by the term of acrylic resin in this invention is a homopolymeric or copolymeric resin of one or more of alkyl esters of acrylic acid or methacrylic acid as exemplified by methyl acrylate, methyl methacrylate, ethyl acrylate, ethyl methacrylate, butyl acrylate and the like. The most widely employed acrylic resin is, however, a homopolymeric polymethyl methacrylate or a copolymeric resin of which the main component, say, 50% by weight or more, is methyl methacrylate component copolymerized with one or more of comonomers such as alkyl acrylates, alkyl methacrylates other than methyl methacrylate, acrylonitrile, methacrylonitrile, styrene, vinyl acetate and other ethylenically unsaturated monomers. The shape of the articles subjected to the method of the present invention is not limitative in sofar as the whole surface thereof can be uniformly treated with low temperature plasma of a gas.

In the method of the present invention, the surface of the shaped article of the acrylic resin is first subjected to exposure to low temperature plasma of a gas having no polymerizability in the plasma condition. Low temperature plasma here implied is well known in the art as a gaseous atmosphere full of electrically charged or excited species, where the temperature of the gaseous atmosphere is not excessively high in comparison with the ambient temperature irrespective of the energies of the charged or excited species per se. Low temperature plasma is produced mainly by glow discharge in a gaseous atmosphere of a pressure in the range from about 0.001 to 10 Torr or, preferably, from 0.01 to 1 Torr where the frequency of the electric power supply for the discharge is not limitative ranging from direct current to the microwave region. In particular, a frequency of the so-called high frequency is recommended due to the possibility of obtaining stable plasma discharge. For example, a frequency of 13.56 MHz or 27.12 MHz is recommended since these frequencies are relatively free from statutory regulations for radio waves.

The shapes and arrangement of the electrodes for the plasma discharge are not limitative in so far as a stable plasma discharge can be ensured within the space in which the surface of the shaped article is exposed to the plasma atmosphere. Thus, a pair of exterior electrodes and a coiled electrode may be used in addition to a pair of inside electrodes according to particular types of the apparatuses for plasma generation. The electrodes may be connected to the high frequency generator either by capacitive coupling or by inductive coupling.

The intensity or power density of the low temperature plasma and the time for the plasma treatment are mutually interrelated parameters, but extreme difficulties are encountered when the power density of low temperature plasma is to be determined explicitly. This is because of the very complicated nature of the plasma atmosphere which is beyond the understanding in the present status of the art. Therefore it is best to determine the time for the plasma treatment in advance by trial runs corresponding to the electric power supply and the particular articles under treatment. With a power density obtained in most of the currently available apparatuses for plasma generation, a time ranging between a few seconds and several tens of minutes is usually sufficient to obtain the desired effect of the inventive method. At any rate, it is a least requirement that the surface of the plasma-treated articles never undergoes thermal degradation by the heat evolved by the plasma discharge.

The other parameters that should be considered in the plasma treatment are the kind of gaseous constituents and the pressure of the gaseous atmosphere in which low temperature plasma is generated. To ensure stability of the plasma discharge, the pressure of the gaseous atmosphere within the apparatus for plasma generation should be maintained in the range from about 0.001 to 10 Torr or, preferably, from 0.01 to 1.0 Torr.

The gases to fill the apparatus for plasma generation should have no polymerizability in the plasma condition since deposition of polymerized matter on the surface of the plasma-treated article is undesirable. In this connection, the gases are selected from such inorganic or inert gases as helium, neon, argon, nitrogen, nitrous oxide, nitrogen dioxide, oxygen, air, chlorine, hydrogen chloride, carbon monoxide, carbon dioxide, hydrogen and the like. These gases may be used either singly or as a mixture of two kinds or more. Among the above mentioned gases, carbon monoxide gas or a gaseous mixture containing carbon monoxide is preferred because of the higher efficiency for an unknown reason.

The shaped article of an acrylic resin having been exposed to low temperature plasma is then brought into contact with a liquid inert to the acrylic resin, i.e. a liquid in which the acrylic resin is not dissolved nor swollen. Such an inert liquid is exemplified by water, methyl alcohol, ethyl alcohol, dioxane and the like, among which the most preferred is water not only by the less expensiveness but also by the highest effectiveness.

The temperature of the inert liquid when the plasma-treated shaped article is in contact therewith is preferably in the range from 0° C. to 50° C. but, most conveniently, the contacting is carried out at room temperature. The duration of contacting with the inert liquid is in the range from a few seconds to several minutes or at least 1 second although an excessively long time exerts no adverse effects. It is not always necessary that the shaped article after completion of the plasma treatment is immediately brought into contact with the inert liquid and the effectiveness is almost unchanged when the plasma-treated article is brought into contact with the liquid within 24 hours after completion of the plasma treatment.

The effectiveness of the treatment with the inert liquid or, typically, water is further increased when an aqueous solution containing a surface active agent is used as the inert liquid. The type of the surface active agent used in this case is not particularly limitative including cationic, anionic, non-ionic and amphoteric surface active agents.

The cationic surface active agents suitable for use are exemplified by salts of primary amines, salts of secondary amines, salts of tertiary amines, quaternary ammonium salts and pyridinium salts and the anionic surface active agents are exemplified by sulfonated oils, soaps, sulfonated ester oils, sulfonated amide oils, sulfonated ester salts of olefins, sulfonated ester salts of aliphatic alcohols, ester salts of alkylsulfuric acids, ethylsulfonic acid salts of fatty acids, salts of alkylsulfonic acids, salts of alkylnaphthalenesulfonic acids, salts of alkylbenzenesulfonic acids, succinic acid ester sulfonates and salts of phosphoric acid esters. The non-ionic surface active agents are exemplified by addition products of ethylene oxide with fatty acids, aliphatic amides, alkylphenols, alkylnaphthols, partial carboxylic acid esters of polyvalent alcohols and the like and block copolymers of ethylene oxide and propylene oxide and the amphoteric surface active agents are exemplified by derivatives of carboxylic acids and derivatives of imidazolines. These surface active agents are dissolved, dispersed or emulsified in water or a mixed solvent of water and an alcohol in a concentration of about 0.01 to 50% by weight or, preferably, 0.01 to 10% by weight.

No particular explanation may be necessary of the manner in which the plasma-treated shaped article of an acrylic resin is brought into contact with the inert liquid. For example, the plasma-treated shaped article is contacted with the inert liquid by dipping, brushing, spraying, steaming or any other conventional method and the shaped article wet with the inert liquid is, if necessary, rinsed with water and dried completely at room temperature or at an elevated temperature.

The shaped article of the acrylic resin treated as described above in accordance with the invention is imparted with very remarkably improved surface characteristics as mentioned before so that the fields of application of acrylic resin shaped articles are further enlarged to a great extent.

Following are the examples to illustrate the method of the present invention in further detail. In the examples, the affinity of the surface to water was evaluated by the contact angle of water and the decrease of the electrostatic surface charge was evaluated by the cigarette ash attraction test in which the surface of the acrylic resin shaped article after treatment was rubbed 10 times with a cotton cloth and kept 3 cm apart above a small deposit of cigarette ash at 25° C. in an atmosphere of 60% relative humidity to find whether the cigarette ash was attracted to the surface of the article or not.

EXAMPLE 1

A transparent plate of 1 mm thickness made of polymethyl methacrylate resin containing no surface active agent was placed in a plasma generating chamber in which low temperature plasma was generated by applying high frequency electric power of 300 watts at 13.56 MHz to the electrodes while the gaseous atmosphere in the chamber was kept under a pressure of 0.4 Torr by passing carbon monoxide gas under a reduced pressure so as that the surface of the resin plate was exposed to the plasma atmosphere for 10 minutes.

The thus plasma-treated resin plate was dipped in an aqueous solution containing a sodium alkylbenzenesulfonate-higher alcohol surface active agent in a concentration of 1% for 1 minute followed by rinsing of the surface with water and air-drying.

The anti-static effect of these resin plates was evaluated by the determination of the contact angle of water and by the cigarette ash attraction test with the resin plate as plasma-treated and with the resin plate treated with the solution of the surface active agent following the plasma treatment. The tests were carried out either immediately after the treatment or after storage up to 6 months. The results are set out in Table 1 below.

TABLE 1

|  |  | Initial | After 1 month | After 3 months | After 6 months |
|---|---|---|---|---|---|
| Plasma-treated | Contact angle of water | 27° | 30° | 35° | 45° |
|  | Cigarette ash attraction | No | No | Slightly yes | Yes |
| Plasma- and surfactant-treated | Contact angle of water | 15° | 18° | 22° | 25° |
|  | Cigarette ash attraction | No | No | No | No |

EXAMPLE 2

Plasma treatment of the same acrylic resin plate as in Example 1 was carried out in the same manner as in Example 1 except that the high frequency electric power was increased to 500 watts with shorter treatment time of 5 minutes and the pressure of the carbon monoxide atmosphere of 0.2 Torr.

The plasma-treated resin plate was dipped for 30 seconds in an aqueous 3% solution of a triethanolamine laurylsulfate surface active agent followed by rinsing of the surface with water and complete air-drying. The results of the test of the anti-static effect undertaken in the same manner as in Example 1 were as set out in Table 2 below.

TABLE 2

|  |  | Initial | After 1 month | After 3 months | After 6 months |
|---|---|---|---|---|---|
| Plasma-treated | Contact angle of water | 25° | 28° | 33° | 40° |
|  | Cigarette ash attraction | No | No | Slightly yes | Yes |
| Plasma- and surfactant-treated | Contact angle of water | 18° | 20° | 25° | 28° |
|  | Cigarette ash attraction | No | No | No | No |

EXAMPLE 3

The acrylic resin plate was also the same as in the preceding examples and the conditions of the plasma treatment were the same as in Example 2 except that the gaseous atmosphere in the chamber was kept under a pressure of 0.6 Torr by passing a 20:80 by volume gaseous mixture of carbon monoxide and argon under a reduced pressure.

The plasma-treated resin plate was dipped for 30 seconds in an aqueous 3% solution of a polyoxyethylene alkylamine surface active agent followed by rinsing of the surface with water and complete air-drying. The results of the test of the anti-static effect undertaken in the same manner as in Example 1 were as set out in Table 3 below.

TABLE 3

|  |  | Initial | After 1 month | After 3 months | After 6 months |
|---|---|---|---|---|---|
| Plasma-treated | Contact angle of water | 27° | 32° | 35° | 48° |
|  | Cigarette ash attraction | No | Slightly yes | Slightly yes | Yes |
| Plasma- and surfactant-treated | Contact angle of water | 18° | 20° | 25° | 26° |
|  | Cigarette ash attraction | No | No | No | No |

What is claimed is:

1. A method for modifying the surface properties of a shaped article of an acrylic resin containing no surface active agent which comprises the steps of
   (a) subjecting the surface of the shaped article to exposure to low temperature plasma of a gas having no polymerizability in the plasma condition,
   (b) bringing the plasma-treated surface of the shaped article into contact with an aqueous liquid containing a surface active agent,
   (c) rinsing the surface of the shaped article with water, and
   (d) drying the surface of the shaped article.

2. The method as claimed in claim 1 wherein the gas having no polymerizability in the plasma condition is carbon monoxide or a gaseous mixture containing carbon monoxide.

3. The method as claimed in claim 1 wherein the length of time in which the plasma-treated surface of the shaped article is in contact with the aqueous liquid containing a surface active agent is at least 1 second.

4. The method as claimed in claim 1 wherein the concentration of the surface active agent in the aqueous liquid is in the range from 0.01 to 10% weight.

* * * * *